United States Patent [19]

Mirlieb et al.

[11] Patent Number: 5,050,203
[45] Date of Patent: Sep. 17, 1991

[54] DEVICE FOR CENTERING X-RAY FILM CASSETTES

[75] Inventors: Bernd Mirlieb, Fellbach; Heinz Killguss, Kornwestheim, both of Fed. Rep. of Germany

[73] Assignee: Eastman Kodak Company, Rochester, N.Y.

[21] Appl. No.: 455,355

[22] PCT Filed: May 9, 1988

[86] PCT No.: PCT/EP88/00404
§ 371 Date: Nov. 8, 1989
§ 102(e) Date: Nov. 8, 1989

[87] PCT Pub. No.: WO88/09003
PCT Pub. Date: Nov. 17, 1988

[30] Foreign Application Priority Data

May 11, 1987 [DE] Fed. Rep. of Germany ....... 3715665

[51] Int. Cl.⁵ .............................................. G03B 42/04
[52] U.S. Cl. .................................... 378/181; 378/167; 378/182
[58] Field of Search ..................... 378/167, 172–175, 378/181, 182, 205

[56] References Cited

U.S. PATENT DOCUMENTS

| 2,097,402 | 10/1937 | Flarsheim . | |
|---|---|---|---|
| 3,150,263 | 9/1964 | Catlin . | |
| 4,538,293 | 8/1985 | Cutter . | |
| 4,539,696 | 9/1985 | Walling et al. | 378/175 |
| 4,675,894 | 6/1987 | Ohlson | 378/181 |
| 4,760,589 | 7/1988 | Siczek | 378/181 |

FOREIGN PATENT DOCUMENTS 3000760 7/1981 Fed. Rep. of Germany .

Primary Examiner—Carolyn E. Fields
Assistant Examiner—David P. Porta
Attorney, Agent, or Firm—G. Herman Childress

[57] ABSTRACT

Cassette centering device for an X-ray cassette loading and unloading device using two parallelly movable guides engageable with the side edges of the cassette, the guides being movable by a lever arrangement driven by a motor, the lever arrangement including a link having two telescoping parts and biasing means constituting force absorbing means for cushioning the engagement of the guides with the cassette and compensating for motor overdrive.

8 Claims, 4 Drawing Sheets

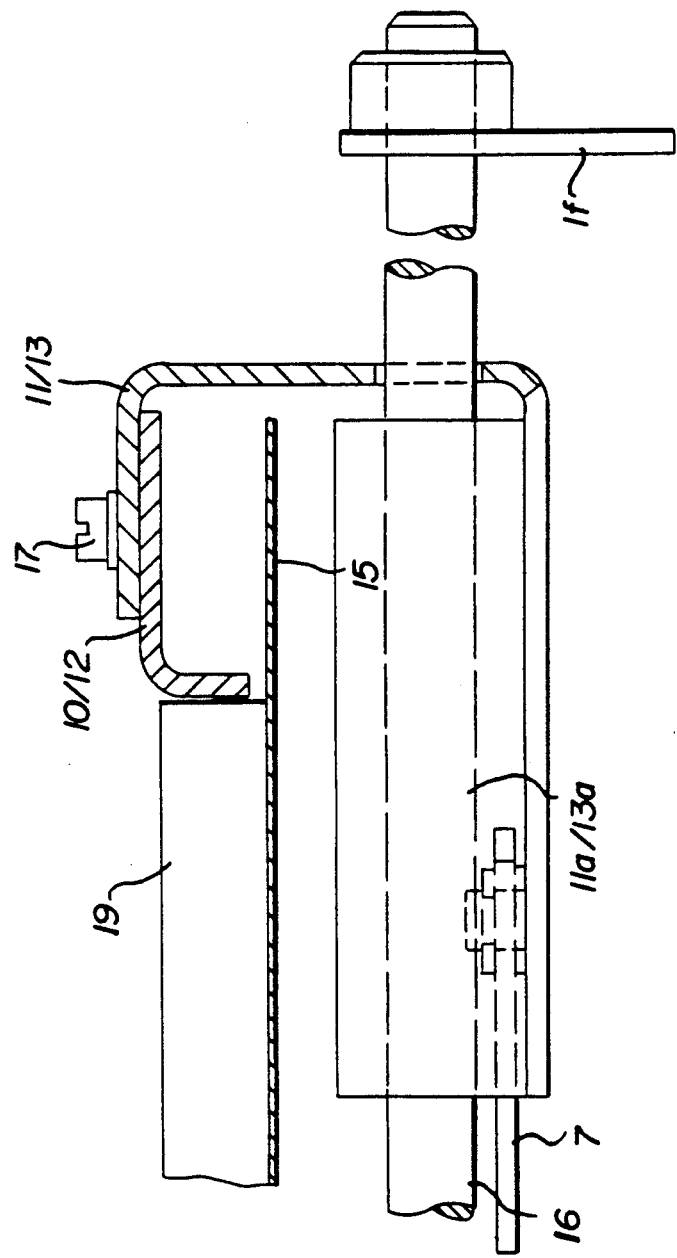

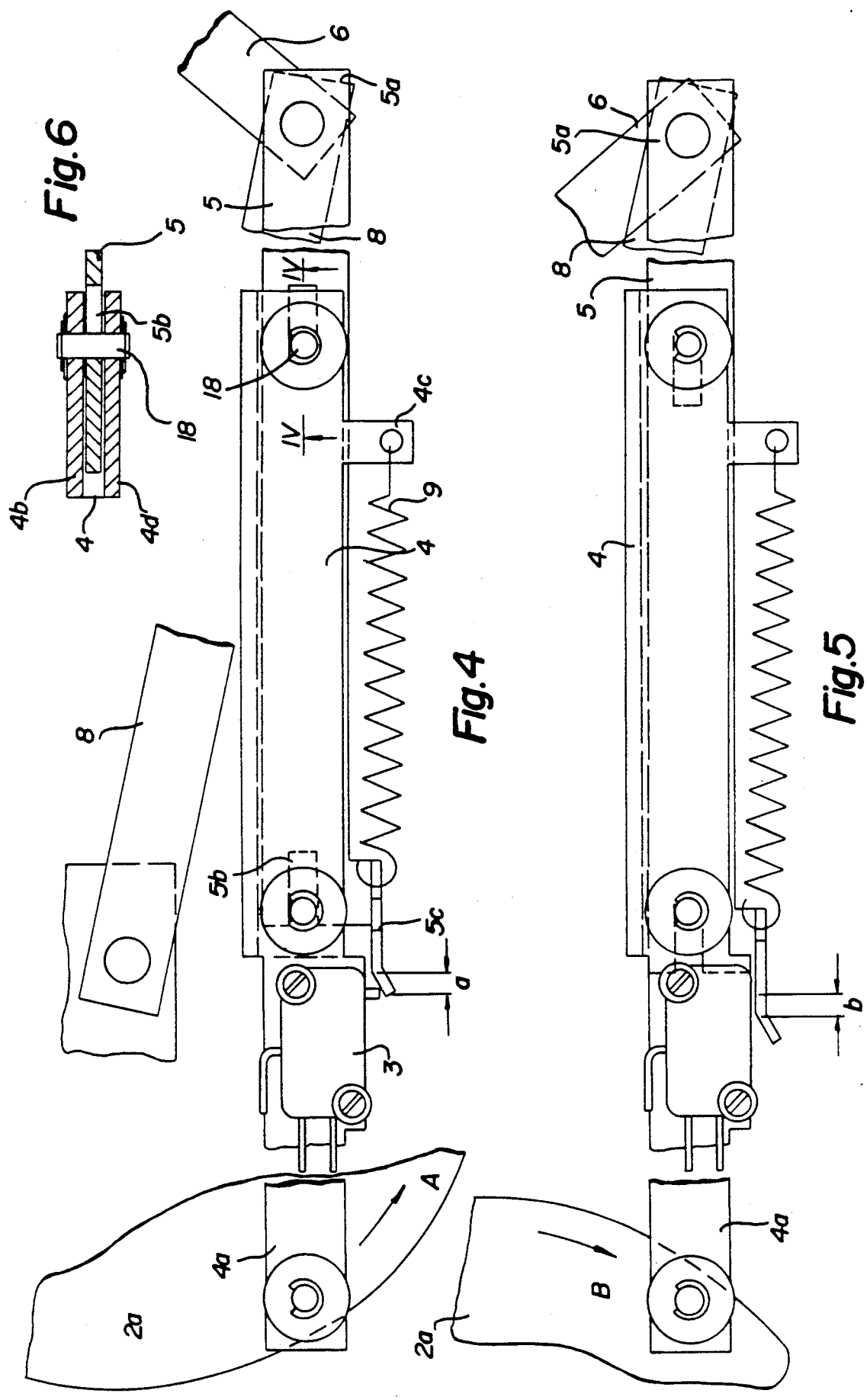

DEVICE FOR CENTERING X-RAY FILM CASSETTES

TECHNICAL FIELD

This invention relates to a device for positioning X-ray film cassettes of different widths by means of two parallelly guided members movable toward and away from each other in a cassette loading and unloading apparatus.

BACKGROUND ART

A centering device of this general type is disclosed in U.S. Pat. No. 3,150,263, issued Sept. 22, 1964 (FIG. 5). The centering device therein disclosed comprises two pneumatically operated crank disks connected together and rotating in opposite directions, each disk being associated with a guide by means of a pair of parallelly pivoted links.

In another cassette positioning device as disclosed in DE-OS 30 00 760, Offenlegungstag July 16, 1981, shifting movement of guide members is accomplished by a motor driven worm gear.

Both of these prior devices are disadvantageous in that the centering and alignment of a film cassette is effected by an abrupt and unabsorbed impact of the guides against the side walls of the cassette. Furthermore, there is no provision for compensating for overtravel of an electric motor in the second device. Moreover, in the case of the first-mentioned device, cassettes of larger sizes can only be precisely and reliably aligned and centered by means of an additional sliding guide engaging the rear end of the cassette and transporting the cassette over the last portion of its path to the loading and unloading station.

DISCLOSURE OF THE INVENTION

The present invention provides a centering device of simple construction that is reliable and precise in operation, in which the impact of the guides against the edges of the cassette is attenuated and wherein the motor moving the bars is switched off at a given point and overtravel of the motor is compensated, such that undue pressure against the edges of the cassette is avoided.

Such operation is achieved by a lever arrangement for moving the guide members, said arrangement being actuated by a power driven link pivotally attached to it and consisting of link portions movable with respect to each other in a telescoping manner, with a force absorbing connection between the link portions, for example, a spring, which urges the link portions to maximum extended position with respect to each other.

In further detail, the link portions telescope together when the guide members abut against the edges of a cassette, the telescoping taking place against the resistance of biasing means. The telescoping movement is arranged such that in a first section of this movement, control means for the power source is actuated, while continued movement to a second section compensates for overtravel of the power source.

As a result of this ingenious arrangement, the bias resisted telescoping of the link portions buffers the impact of the guide members against the edges of the cassette when aligning and centering takes place, yet the cassette is precisely aligned, free from play. The power source is switched off while the guide members are still being shifted together and overtravel of the motor is compensated, thus avoiding clamping the guide elements too tightly against the cassette.

The guide members are conveniently made at least as long as a cassette of maximum size, and the members are guided in their movement by a guide rod as well as guide rails. The free ends of the guide members extend into the interior of the apparatus and are provided with guide grooves.

The invention is shown in a preferred embodiment in the appended drawings which are described below. In the drawings;

BRIEF DESCRIPTION OF THE DRAWINGS

FIG. 3 shows a detail of the construction in a sectional view along line II—II;

FIGS. 4 and 5 are plan veiws corresponding to portions of FIGS. 1 and 2, respectively; and FIG. 6 is a sectional view taken on line IV—IV of FIG. 4.

MODES OF CARRYING OUT THE INVENTION

Figure 1:
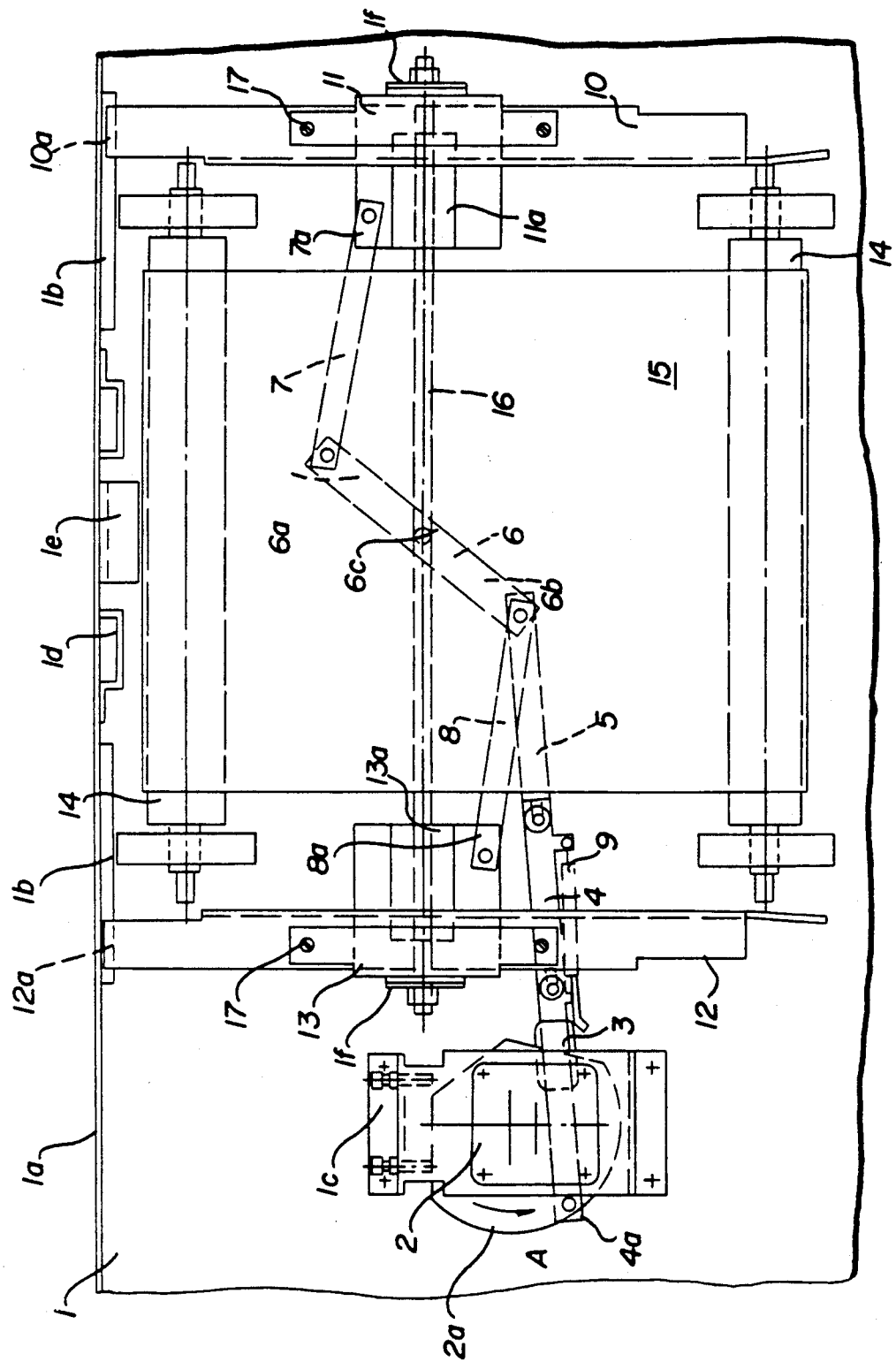
FIGS. 1 and 2 are plan views showing the apparatus in two functional positions.

Referring now to FIG. 1, there is shown apparatus 1 for unloading film sheets from X-ray film cassettes of different sizes and loading such cassettes with unexposed film. This invention is, of course, concerned only with the cassette centering portion of such apparatus in the area of the unloading and loading station. The centering device comprises two parallelly guided members 10 and 12 movable toward and away from each other. These members are located above a cassette transport belt 15 which transports the cassette 19 (FIGS. 2 and 3) from an input point to the loading and unloading station. The belt passes around two rollers 14, one of which is driven. The cassette shown in the drawings is smaller than the maximum size that can be handled by this apparatus.

Figure 2:
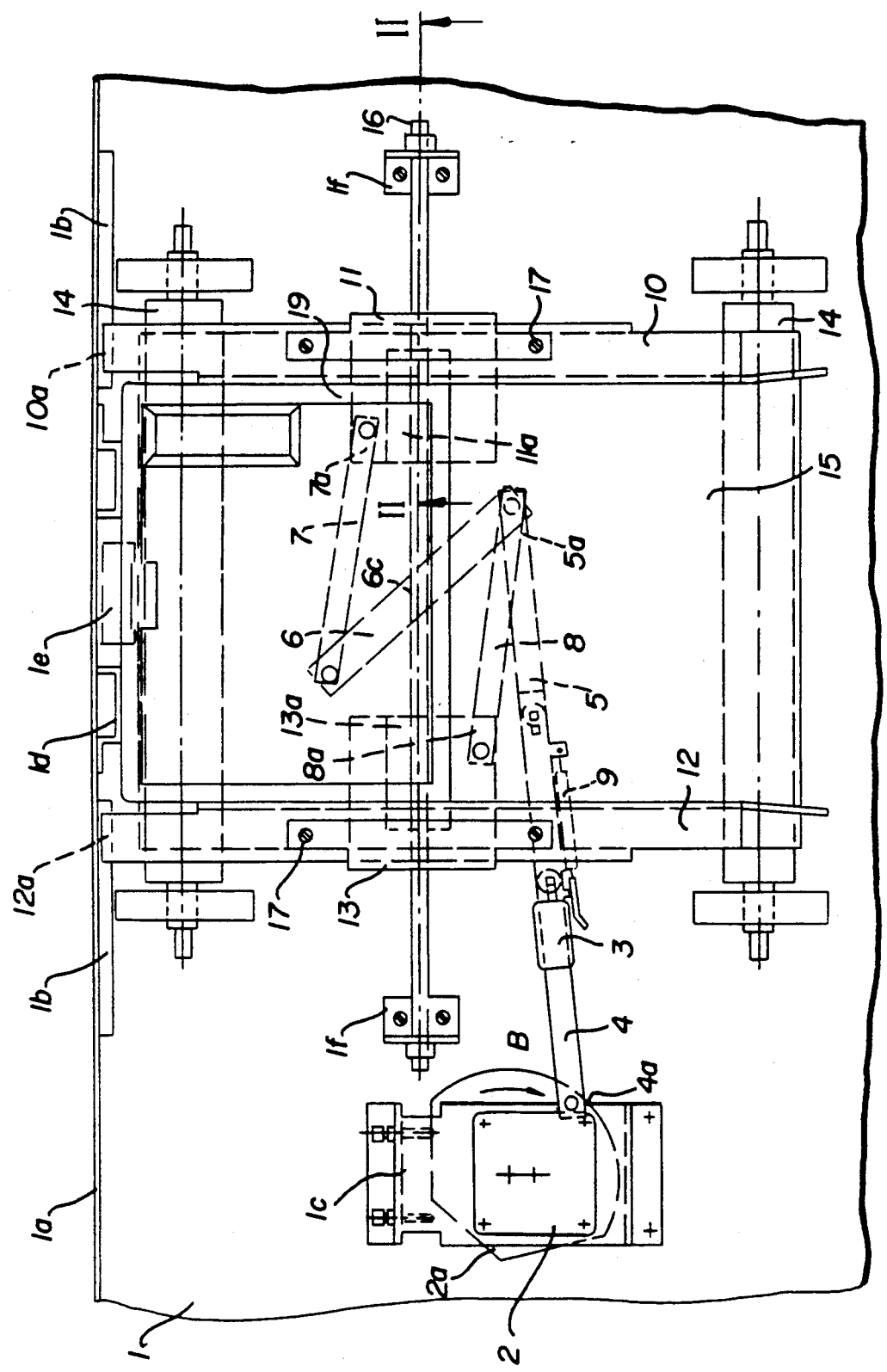

As can be seen from FIGS. 1-3, members 10 and 12, which we refer to as guide members, are attached to angle plates 11 and 13, respectively, by means of bolts 17. The respective angle plates 11 and 13 are movably mounted by means of guide sleeves 11a and 13a, respectively, on a guide shaft 16 secured between two mounting angles. The ends of members 10, 12 which extend into the interior of the apparatus are provided with guide grooves 10a and 12a (FIGS. 1 and 2). These guide grooves cooperate with guide rails 1b on an intermediate wall 1a of the apparatus, thus providing additional guiding for the movement of members 10 and 12. A guide ramp for the cassettes is indicated at 1e. It is located on the intermediate wall 1a. Two cassette abutments fastened to that wall are shown at 1d.

A symmetrical lever arrangement located between guide members 10 and 12 serves to actuate said members. The lever arrangement consists of a lever 6 pivoted centrally about a stationary pin 6c. At one free end 6a (FIG. 1), a first lever arm 7 is connected pivotally to lever 6. Arm 7 extends to the right as viewed in FIG. 1 and is pivotally connected to angle plate 11 which supports guide member 10. At its other free end 6b, lever 6 is connected pivotally to a leftward extend lever arm 8, which is pivotally connected to angle plate 13.

A drive motor 2 is mounted to an angle part 1c. A link consisting of portions 4 and 5 transmits drive from the motor to the lever arrangement just described. A crank disk 2a driven by the motor rotates in either of two directions indicated by the arrows A and B in FIGS. 1 and 2. End 4a of portion 4 of the link is pivotally attached to the crank disk. End 5a of portion 5 of the link is pivotally attached at the connection between lever 6 and lever arm 8.

As shown in some detail in FIGS. 4-6, the two portions 4 and 5 of the link are linearly shiftable with regard to each other in a telescoping manner. A motor controlling switch 3 is mounted on a central portion of link portion 4. The portion of 4 to the right of the switch is U-shaped in cross section (FIG. 6) and slidably receives the left section of portion 5. Two pin and slot arrangements provide a connection between portions 4 and 5. The slots are indicated at 5b and the pins at 18.

Biasing means in the form of spring 9 is connected at one end to a tongue 4c of portion 4 and at the other end to a tab 5c on portion 5. Spring 9 biases the two portions 4 and 5 apart to the extended position shown in FIG. 4 and constitutes force absorbing means which buffers the cassette engaging movement of the guide members 10, 12 and compensates for motor overtravel after the motor is switched off. In the extended, initial position of portions 4 and 5, a bent off portion 5c on the left end of portion 5 rests loosely on the actuating button of switch 3.

When a cassette 19 is transported from the input point to the loading and unloading station, motor 2 is switched on by switch means, not shown, when the leading edge of the cassette contacts one of the abutments 1d. The motor then rotates crank disk 2a in the direction A and thereby moves link 4, 5 to the right to actuate lever arrangement 6, 7, 8 to cause movement of guide members 10, 12 toward each other.

When guide members 10, 12 abut against the edges of a cassette positioned between them, the slight resistance they thus encounter resists further movement of link portion 5 to the right, whereupon link portion 4 begins telescoping movement with respect to portion 5 as permitted by the pin and slot connection 5b, 18. This is accompanied by stretching of spring 9 and movement of switch 3 relative to portion 5 through path section "a" as shown in FIG. 4. The actuating button of the switch is thereby depressed by 5c and the motor is turned off. Overtravel of the motor, if not compensated, would cause guide members 10, 12 to engage the cassette edges too firmly and distort it or interfere with further operations on the cassette. Overtravel of the motor is compensated in a second path section "b" as shown in FIG. 4. Spring 9 and the pin and slot connection permit, yet buffer, further movement of link portion 4 during overdrive and also absorb the impact of guide members 10, 12 against the sides of the cassette.

While the invention has been described in connection with the handling of X-ray cassettes, it will be understood that it is also applicable to other devices in which the same problems overcome by this invention, are encountered.

The invention has been described with reference to a preferred embodiment. However, it will be appreciated that variations and modifications can be effected within the ordinary skill in the art without departing from the scope of the invention.

I claim:

1. In an X-ray film cassette centering device of the power operated type in which guide members are movable in parallel toward and away from each other to accommodate cassettes of different widths, the improvement comprising:
   a lever arrangement operatively connected to said guide members for accomplishing the parallel movement; and
   a link movable by a power source and operatively connected to said lever arrangement, said link comprising telescoping portions having force absorbing means operating when said portions are telescoped together.

2. A device as set forth in claim 1, wherein one of said link portions includes means for controlling the power source.

3. A device as set forth in claim 1, wherein said force absorbing means comprises biasing means connecting the respective link portions.

4. A device as set forth in claim 3, wherein said biasing means urges said link portions to their fully extended positions.

5. A device as set forth in claim 1, wherein the power source is electric switch controlled and one of said link portions carries means for operating said switch.

6. A device as set forth in claim 5, wherein electric switch is carried by one of said link portions and said means for operating the switch is carried by another link portion.

7. A device as set forth in claim 6, wherein said switch operating means is positioned to disable the power source as said link portions are telescoped together against the resistance of said force absorbing means.

8. A device as set forth in claim 7, wherein said switch operating means is so positioned in relation to the switch and the telescoping link portions are so dimensioned that in a first portion of the telescoping movement, the switch is operated to disable the power source, and in a second portion of said movement, said force absorbing means compensates for overtravel of the power source.

* * * * *